(12) United States Patent
Song et al.

(10) Patent No.: US 11,722,326 B2
(45) Date of Patent: Aug. 8, 2023

(54) POWERED DEVICE (PD) DETECTION DEVICE

(71) Applicant: Huawei Technologies Co., Ltd., Shenzhen (CN)

(72) Inventors: Weiping Song, Dongguan (CN); Zhongshu Zhang, Chengdu (CN); Wanxiang Ma, Dongguan (CN); Jinlong Wang, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/684,049

(22) Filed: Mar. 1, 2022

(65) Prior Publication Data

US 2022/0286306 A1    Sep. 8, 2022

(30) Foreign Application Priority Data

Mar. 2, 2021 (CN) .......................... 202110228890.1

(51) Int. Cl.
*H04L 12/10* (2006.01)
(52) U.S. Cl.
CPC .................................... *H04L 12/10* (2013.01)
(58) Field of Classification Search
CPC . G06F 1/26; G06F 1/266; H04L 12/10; H04L 12/12; H04L 12/40039; H04L 12/40045
See application file for complete search history.

(56) References Cited

U.S. PATENT DOCUMENTS

| 6,115,468 A | * | 9/2000 | De Nicolo | H04B 3/548 379/900 |
| 7,145,439 B2 | * | 12/2006 | Darshan | H04L 12/10 340/687 |

(Continued)

FOREIGN PATENT DOCUMENTS

| CN | 101207290 A | 6/2008 |
| CN | 103067182 A | 4/2013 |

(Continued)

*Primary Examiner* — James M Perez
(74) *Attorney, Agent, or Firm* — Leydig, Voit & Mayer, Ltd.

(57) ABSTRACT

A powered device (PD) detection device is configured to identify a type of power sourcing equipment. The PD detection device includes a detection circuit and a processing circuit, and the detection circuit is connected to the processing circuit. The detection circuit is configured to: receive hierarchical waveform information sent by the power sourcing equipment, and generate a corresponding first-type signal or a corresponding second-type signal based on the hierarchical waveform information, and is further configured to send the first-type signal or the second-type signal to the processing circuit, where the first-type signal corresponds to first-type power sourcing equipment, and the first-type power sourcing equipment includes at least one of non-standard power sourcing equipment and a direct current adapter. The processing circuit is configured to: receive the first-type signal or the second-type signal, and determine the type of the power sourcing equipment based on the first-type signal or the second-type signal.

20 Claims, 7 Drawing Sheets

(56) References Cited

U.S. PATENT DOCUMENTS

| | | | | |
|---|---|---|---|---|
| 7,550,980 B2* | 6/2009 | Picard | H04L 12/10 | 324/705 |
| 7,681,052 B2* | 3/2010 | Darshan | H04L 12/10 | 713/300 |
| 7,793,124 B2* | 9/2010 | Landry | H04L 12/10 | 713/323 |
| 7,921,307 B2* | 4/2011 | Karam | G01R 21/00 | 713/300 |
| 8,108,723 B2* | 1/2012 | Diab | H04L 12/10 | 714/24 |
| 8,234,086 B2* | 7/2012 | Karam | H04L 12/10 | 702/117 |
| 8,464,081 B2* | 6/2013 | Hussain | H04L 12/66 | 375/253 |
| 8,539,259 B2* | 9/2013 | Darshan | H04L 12/10 | 713/300 |
| 8,635,473 B2* | 1/2014 | Karam | H04L 12/44 | 713/340 |
| 8,667,310 B2* | 3/2014 | Darshan | H04L 12/10 | 713/300 |
| 8,782,442 B2* | 7/2014 | Woo | G06F 1/266 | 713/300 |
| 8,782,448 B2* | 7/2014 | Tanizawa | H04L 12/40045 | 713/300 |
| 9,069,539 B2* | 6/2015 | Schlichter | G06F 1/3203 | |
| 9,209,981 B2* | 12/2015 | Heath | H04L 12/10 | |
| 9,665,151 B1* | 5/2017 | Zou | G06F 1/28 | |
| 9,768,978 B2* | 9/2017 | Coenen | H02J 7/00047 | |
| 10,027,494 B2* | 7/2018 | Yang | H04L 41/0813 | |
| 10,075,302 B2* | 9/2018 | Cao | H04L 43/50 | |
| 10,142,116 B2* | 11/2018 | Huang | G06F 1/28 | |
| 10,567,711 B1* | 2/2020 | Skeoch | H02M 1/008 | |
| 10,594,367 B1* | 3/2020 | Bhagwat | H04B 3/54 | |
| 10,692,674 B2* | 6/2020 | Waters | G01R 31/40 | |
| 10,764,071 B1* | 9/2020 | Ciholas | G06F 11/3058 | |
| 10,855,479 B2* | 12/2020 | Yseboodt | G05B 19/042 | |
| 10,931,105 B2* | 2/2021 | Barker | H02J 1/12 | |
| 11,070,393 B2* | 7/2021 | Yan | H04L 12/10 | |
| 11,543,844 B2* | 1/2023 | Goergen | H04L 12/40176 | |
| 2005/0197094 A1* | 9/2005 | Darshan | H04L 12/10 | 370/395.53 |
| 2006/0078093 A1* | 4/2006 | Karam | H04L 41/0604 | 379/24 |
| 2006/0092000 A1* | 5/2006 | Karam | H04L 12/44 | 713/300 |
| 2006/0100799 A1* | 5/2006 | Karam | G06F 1/3228 | 702/57 |
| 2006/0168459 A1* | 7/2006 | Dwelley | H04L 12/10 | 713/300 |
| 2006/0171399 A1* | 8/2006 | Ferentz | H04L 12/10 | 370/395.53 |
| 2006/0212724 A1* | 9/2006 | Dwelley | H04L 12/10 | 713/300 |
| 2007/0103829 A1* | 5/2007 | Darshan | H04L 12/10 | 361/90 |
| 2007/0133238 A1* | 6/2007 | Herbold | H04L 12/10 | 363/63 |
| 2008/0098240 A1* | 4/2008 | Hussain | H04L 12/66 | 713/300 |
| 2009/0041004 A1* | 2/2009 | Emmanuel | H04L 1/188 | 370/352 |
| 2009/0058436 A1* | 3/2009 | Yu | G01R 27/04 | 324/722 |
| 2009/0222678 A1* | 9/2009 | Yu | G06F 1/266 | 713/300 |
| 2009/0249112 A1* | 10/2009 | Diab | H04L 12/10 | 713/300 |
| 2010/0171626 A1* | 7/2010 | Darshan | G01R 19/1659 | 340/657 |
| 2010/0217447 A1* | 8/2010 | Karam | H04L 12/10 | 700/286 |
| 2010/0321169 A1* | 12/2010 | Hussain | H04L 12/66 | 713/300 |
| 2011/0163605 A1* | 7/2011 | Ronen | H04L 12/10 | 307/71 |
| 2012/0079297 A1* | 3/2012 | Tanizawa | H04L 12/40039 | 713/310 |
| 2013/0191654 A1* | 7/2013 | Schlichter | G06F 1/3203 | 713/300 |
| 2013/0257161 A1* | 10/2013 | Ferentz | H04L 12/10 | 307/80 |
| 2013/0335230 A1* | 12/2013 | Darshan | G01R 19/1659 | 340/660 |
| 2014/0108847 A1* | 4/2014 | Karam | G06F 1/26 | 713/340 |
| 2014/0139346 A1* | 5/2014 | Darshan | H04L 12/10 | 340/660 |
| 2014/0142765 A1* | 5/2014 | Gammel | H04L 12/6418 | 700/286 |
| 2014/0340233 A1* | 11/2014 | Darshan | G06F 1/28 | 340/660 |
| 2015/0130269 A1* | 5/2015 | Barrass | H04L 12/40045 | 307/1 |
| 2015/0145324 A1* | 5/2015 | Heath | H04L 12/40045 | 307/1 |
| 2015/0355697 A1* | 12/2015 | Darshan | G06F 1/26 | 713/340 |
| 2016/0095175 A1* | 3/2016 | Picard | H04L 12/10 | 307/1 |
| 2016/0273722 A1* | 9/2016 | Crenshaw | H02J 7/0047 | |
| 2016/0363980 A1* | 12/2016 | Spiel | H04L 12/10 | |
| 2017/0104421 A1* | 4/2017 | Chiu | H02M 3/33507 | |
| 2017/0140887 A1* | 5/2017 | Waters | G06F 1/266 | |
| 2018/0019884 A1* | 1/2018 | Radermacher | H04L 12/2807 | |
| 2018/0139063 A1* | 5/2018 | Yseboodt | H04L 12/10 | |
| 2018/0150127 A1* | 5/2018 | Wendt | G06F 1/3206 | |
| 2018/0219635 A1* | 8/2018 | Sipes, Jr. | H04N 23/65 | |
| 2018/0323981 A1* | 11/2018 | Zhuang | H04L 12/10 | |
| 2018/0375673 A1* | 12/2018 | Wendt | H04L 12/10 | |
| 2019/0129485 A1* | 5/2019 | Amano | H04L 12/12 | |
| 2019/0190727 A1* | 6/2019 | LaBosco | G06F 1/266 | |
| 2019/0386836 A1* | 12/2019 | Gong | H04L 12/40045 | |
| 2020/0274732 A1* | 8/2020 | Yan | H04L 12/10 | |
| 2021/0006420 A1* | 1/2021 | Neyland | G06F 1/3296 | |
| 2021/0263545 A1* | 8/2021 | Goergen | G05F 1/577 | |
| 2022/0171443 A1* | 6/2022 | Kumar | H02J 7/0042 | |
| 2022/0286306 A1* | 9/2022 | Song | H04L 12/10 | |

FOREIGN PATENT DOCUMENTS

| | | |
|---|---|---|
| CN | 103488268 A | 1/2014 |
| CN | 104348631 A | 2/2015 |
| CN | 204498138 U | 7/2015 |
| CN | 106330467 A | 1/2017 |
| CN | 107547210 A | 1/2018 |
| CN | 111555937 A | 8/2020 |
| CN | 112202569 A | 1/2021 |
| EP | 1842328 B1 | 9/2018 |

* cited by examiner

1-EVENT detection hierarchical waveform

FIG. 6A

2-EVENT detection hierarchical waveform

FIG. 6B

3-EVENT detection hierarchical waveform

FIG. 6C

4-EVENT detection hierarchical waveform

FIG. 6D

5-EVENT detection hierarchical waveform

POWERED DEVICE (PD) DETECTION DEVICE

CROSS-REFERENCE TO RELATED APPLICATION

This application claims priority to Chinese Patent Application No. 202110228890.1, filed on Mar. 2, 2021, which is hereby incorporated by reference in its entirety.

TECHNICAL FIELD

Embodiments of this application relate to the circuit detection field, and in particular, to a powered device (PD) detection device.

BACKGROUND

With development of the Ethernet, power over Ethernet (PoE) technologies are used by an increasing quantity of network devices. A power over Ethernet system includes power sourcing equipment (PSE) and a powered device (PD). The power sourcing equipment and the powered device are connected by using a link. The power sourcing equipment and the powered device may transmit data to each other by using the link, and the power sourcing equipment may supply power to the powered device by using the link.

In an existing multi-port power over Ethernet technical solution, for a power over Ethernet system that supports a link layer discovery protocol (LLDP), power sourcing equipment and a powered device can send an advertisement to each other to learn of respective information and statuses. However, for a power over Ethernet system that does not support the link layer discovery protocol, power sourcing equipment and a powered device can only obtain respective information and statuses by using a link. For example, before the power sourcing equipment starts to supply power to the powered device, the power sourcing equipment may determine a power level of the powered device by using the link, and the powered device may also determine a power supply capability and a device type of the power sourcing equipment by using the link. For example, the powered device may determine whether the power sourcing equipment is AF power sourcing equipment, AT power sourcing equipment, or BT power sourcing equipment. However, the powered device cannot determine, by using the link, whether the front end is non-standard power sourcing equipment or an adapter. Therefore, whether the front-end power sourcing equipment is non-standard power sourcing equipment or an adapter can be detected only by adding an isolation circuit.

The powered device can determine whether the front-end power sourcing equipment is non-standard power sourcing equipment or an adapter, but the isolation circuit needs to be added. This increases complexity of the power over Ethernet system, and increases costs of the power over Ethernet system.

SUMMARY

Embodiments of this application provide a powered device (PD) detection device, configured to accurately identify a type of power sourcing equipment.

A first aspect of the embodiments of this application provides a powered device PD detection device. The PD detection device is connected to power sourcing equipment by using a power supply link. The power sourcing equipment may transmit electric energy and send data information to a powered device by using the power supply link. The PD detection device includes a detection circuit and a processing circuit, and the detection circuit is connected to the processing circuit. The detection circuit is configured to: receive hierarchical waveform information from the power sourcing equipment, and generate a corresponding first-type signal or a corresponding second-type signal based on the hierarchical waveform information, where the first-type signal corresponds to first-type power sourcing equipment, the second-type signal corresponds to second-type power sourcing equipment, the first-type power sourcing equipment includes non-standard power sourcing equipment or an adapter, and the second-type power sourcing equipment includes AF power sourcing equipment, AT power sourcing equipment, or BT power sourcing equipment. The processing circuit is configured to: determine, based on the first-type signal, that the power sourcing equipment is the first-type power sourcing equipment, or determine, based on the second-type signal, that the power sourcing equipment is the second-type power sourcing equipment.

In this possible implementation, the detection circuit of the PD detection device in the embodiments receives the hierarchical waveform information sent by the power sourcing equipment, and generates the corresponding first-type signal or the corresponding second-type signal based on the hierarchical waveform information. The detection circuit further sends the first-type signal or the second-type signal to the processor circuit. The first-type signal is a signal corresponding to the first-type power sourcing equipment, and the first-type power sourcing equipment includes at least one of the non-standard power sourcing equipment and the adapter. The processor circuit is configured to: receive the first-type signal or the second-type signal, and determine a type of the power sourcing equipment based on the first-type signal or the second-type signal. In the embodiments of this application, an isolation circuit does not need to be added, to determine whether the front-end power sourcing equipment is the first-type power sourcing equipment such as the non-standard power sourcing equipment or the adapter, and determine a type of the first-type power sourcing equipment. This reduces complexity of a power over Ethernet system, and reduces costs of the power over Ethernet system.

In a possible implementation of the first aspect, if the first-type signal is a first signal, the power sourcing equipment is the non-standard power sourcing equipment; or if the first-type signal is a second signal, the power sourcing equipment is the adapter, where voltages or duty cycles of the first signal and the second level are different.

In a possible implementation of the first aspect, if the second-type signal is a third signal, the power sourcing equipment is the AF power sourcing equipment; if the second-type signal is a fourth signal, the power sourcing equipment is the AT power sourcing equipment; or if the second-type signal is a fifth signal, the power sourcing equipment is the BT power sourcing equipment, where duty cycles or levels of the third signal, the fourth signal, and the fifth signal are different.

In a possible implementation of the first aspect, the PD detection device further includes a power adjustment circuit, and the power adjustment circuit is connected to the processing circuit. The processing circuit is further configured to send a power adjustment signal to the power adjustment circuit based on a type of the power sourcing equipment. The power adjustment circuit is configured to perform power adjustment based on the power adjustment signal.

In this possible implementation, the powered device further includes the power adjustment circuit. The power adjustment circuit may perform power adjustment based on the power adjustment signal sent by the processor, to provide a manner for determining the type of the power sourcing equipment by the powered device. Because the type of the front-end power sourcing equipment that is determined by the powered device is more accurate, power adjustment performed by the power adjustment circuit based on the type of the power sourcing equipment is more accurate.

In a possible implementation of the first aspect, the power adjustment circuit includes a power management unit and a service unit, and the power management unit is connected to the service unit. The power management unit is configured to adjust an input signal of the service unit based on the power adjustment signal, where the input signal includes at least one of an input voltage and an input current.

In this possible implementation, the embodiments exemplarily provide the power adjustment circuit that includes the power management unit and the service unit, and determine an adjustment object and an adjustment method for performing power adjustment by the power adjustment circuit, thereby enhancing feasibility of performing power adjustment based on the type of the power sourcing equipment.

In a possible implementation of the first aspect, if the power sourcing equipment is the adapter, the power adjustment circuit is configured to adjust, based on the power adjustment signal, power of the service unit to maximum power allowed by the adapter.

In a possible implementation of the first aspect, the detection circuit includes an interface unit and a powered device PD circuit unit, and the interface unit is connected to the PD circuit unit. The interface unit is configured to: receive the hierarchical waveform information sent by the power sourcing equipment, and send the hierarchical waveform information to the PD circuit unit. The PD circuit unit is configured to generate the corresponding first-type signal or the corresponding second-type signal based on the hierarchical waveform information.

In a possible implementation of the first aspect, the detection circuit further includes a rectifier unit. The rectifier unit is configured to: adjust the hierarchical waveform signal, and transmit an adjusted hierarchical waveform signal to the PD circuit unit. The PD circuit unit is configured to generate the corresponding first-type signal or the corresponding second-type signal based on the adjusted hierarchical waveform signal.

In a possible implementation of the first aspect, the PD detection device further includes a power supply circuit, and the power supply circuit is separately connected to the detection circuit and the power adjustment circuit. The power supply circuit is configured to: adjust a voltage output by the detection circuit, and supply power to the power adjustment circuit.

A second aspect of this application provides a powered device. The powered device includes the powered device PD detection device in the first aspect or any possible implementation of the first aspect.

A third aspect of this application provides a power over Ethernet system. The power over Ethernet system includes the powered device in the second aspect or any possible implementation of the second aspect and the power sourcing equipment in the first aspect or any possible implementation of the first aspect.

It can be learned from the foregoing technical solutions that the embodiments of this application have the following advantages:

In the embodiments of this application, the detection circuit of the powered device receives the hierarchical waveform information sent by the power sourcing equipment, and generates the corresponding first-type signal or the corresponding second-type signal based on the hierarchical waveform information. The detection circuit further sends the first-type signal or the second-type signal to the processor circuit. The first-type signal or the second-type signal includes a first-type signal corresponding to the first-type power sourcing equipment or a second-type signal type corresponding to the second-type power sourcing equipment, and the first-type power sourcing equipment includes the at least one of the non-standard power sourcing equipment and the adapter. The processor circuit is configured to: receive the first-type signal or the second-type signal, and determine the type of the power sourcing equipment based on the first-type signal or the second-type signal. In the embodiments of this application, whether the front-end power sourcing equipment is the first-type power sourcing equipment such as the non-standard power sourcing equipment or the adapter can be determined without adding the isolation circuit. This reduces complexity of the power over Ethernet system, and reduces costs of the power over Ethernet system.

DETAILED DESCRIPTION

The embodiments of this application disclose a powered device (PD) detection device, configured to accurately identify a type of power sourcing equipment.

The following describes embodiments of this application with reference to accompanying drawings. It is clear that the described embodiments are merely some rather than all of the embodiments of this application. A person of ordinary skill in the art may learn that the technical solutions provided in the embodiments of this application are also applicable to a similar technical problem as a technology evolves and a new scenario emerges.

In the specification, claims, and the accompanying drawings of this application, the terms "first", "second", and the like are intended to distinguish similar objects but do not necessarily indicate a specific order or sequence. It should be understood that data termed in such a way is interchangeable in proper circumstances, so that the embodiments described herein can be implemented in other orders than the order illustrated or described herein. In addition, the terms "include", "have" and any other variants mean to cover the non-exclusive inclusion. For example, a process, method, system, product, or device that includes a list of steps or units is not necessarily limited to those units, but may include other units not expressly listed or inherent to such a process, method, product, or device.

Figure 1:
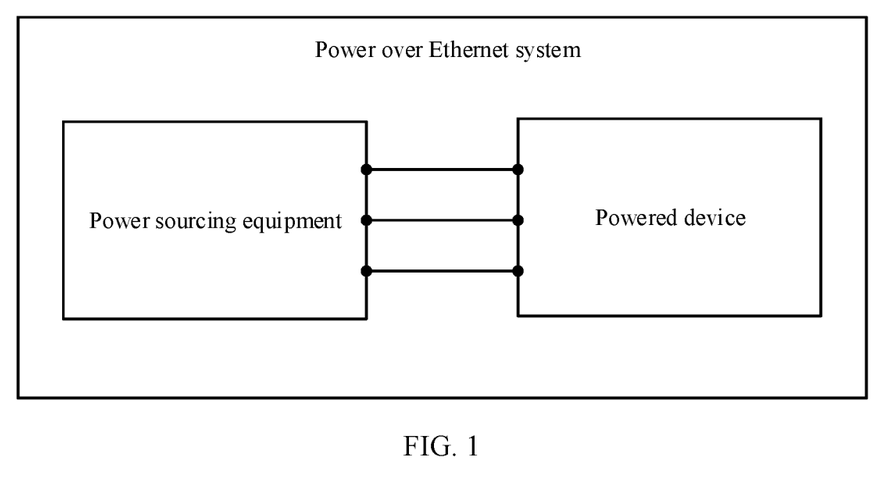
FIG. 1 is a schematic diagram of a scenario of a power over Ethernet system.

As shown in FIG. 1, a power over Ethernet (PoE) system includes power sourcing equipment (PSE) and a powered device (PD). The power sourcing equipment and the powered device are connected by using a link. The power sourcing equipment and the powered device may transmit data to each other by using the link, and the power sourcing equipment may supply power to the powered device by using the link. The power sourcing equipment includes a switch, an intermediate span device, an adapter, and the like. The powered device includes an IP camera, a palmtop computer, a mobile phone, a wireless access device, and the like.

Figure 2:
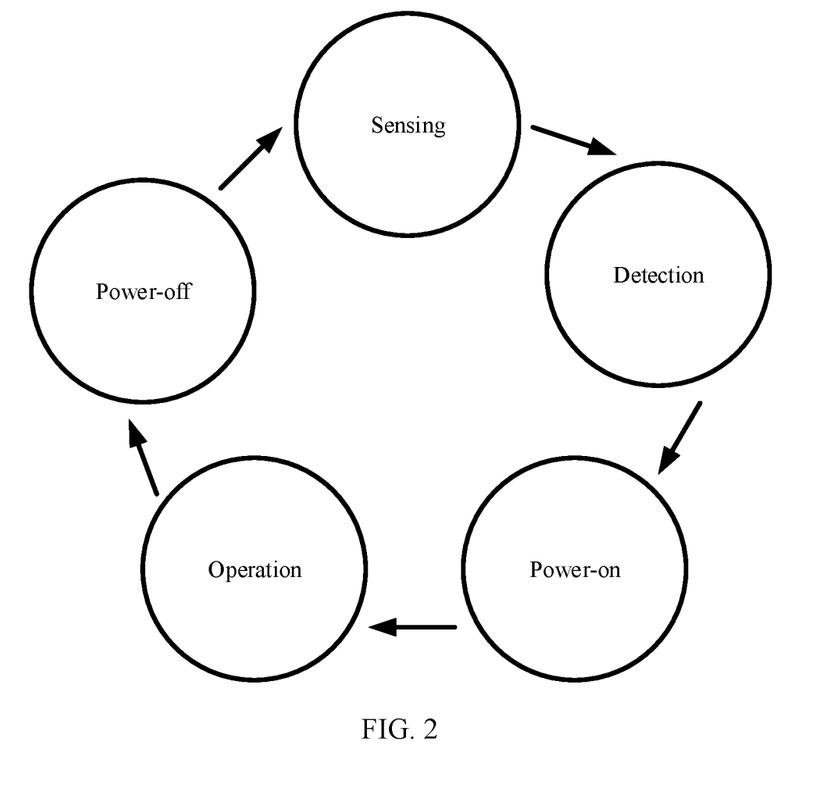
FIG. 2 is a network framework diagram of a power over Ethernet system.

As shown in FIG. 2, a power over Ethernet system mainly includes five main steps from start to end: sensing, detection, power-on, operation, and power-off. For the detection step, in an existing multi-port power over Ethernet technical solution, for a power over Ethernet system that supports a link layer discovery protocol (LLDP), power sourcing equipment and a powered device can send an advertisement to each other to learn of respective information and statuses. However, for a power over Ethernet system that does not support the link layer discovery protocol, power sourcing equipment and a powered device can only obtain respective information and statuses by using hardware.

Figure 3:
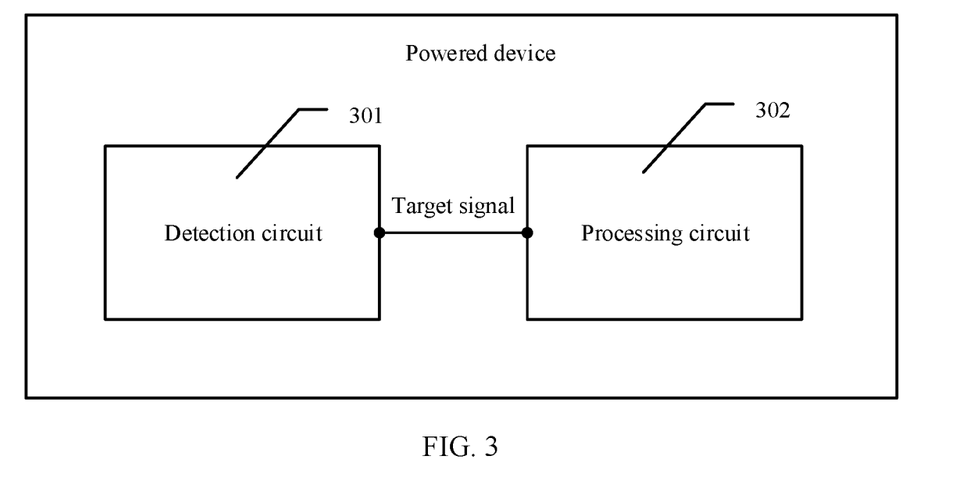
FIG. 3 is a schematic diagram of a structure of a powered device.

As shown in FIG. 3, before power sourcing equipment starts to normally supply power to a powered device, a processing circuit 302 of the powered device may determine a power supply capability and a device type of the power sourcing equipment by using a T2P signal sent by a detection circuit 301. The powered device may determine whether the power sourcing equipment is AF power sourcing equipment, AT power sourcing equipment, or BT power sourcing equipment. The AF power sourcing equipment is power sourcing equipment that conforms to the POE standard IEEE802.3 af, the AT power sourcing equipment is power sourcing equipment that conforms to the POE standard IEEE802.3 at, and the BT power sourcing equipment is power sourcing equipment that conforms to the POE standard IEEE802.3 bt.

Table 1 is a correspondence between a type of a T2P signal and a type of power sourcing equipment in the conventional technology.

TABLE 1

| Type of a T2P signal | Type of power sourcing equipment |
| --- | --- |
| HIGH | AF power sourcing equipment, non-standard power sourcing equipment, and DC48V adapter |
| Low level | AT power sourcing equipment |
| 1/2 duty cycle | BT power sourcing equipment |

It may be learned from Table 1 that the T2P signals corresponding to the AF power sourcing equipment, the non-standard power sourcing equipment, and the DC48V adapter are all high-level T2P signals. Therefore, to further distinguish from a front-end power sourcing equipment, in the conventional technology, an isolation circuit unit 303 shown in FIG. 3 is added to detect a type of the front-end power sourcing equipment. The isolation circuit unit may be an optical coupling circuit, and the isolation circuit unit sends a detection signal to the powered device, and the powered device determines the type of the front-end power sourcing equipment based on the isolation circuit unit.

Figure 4:
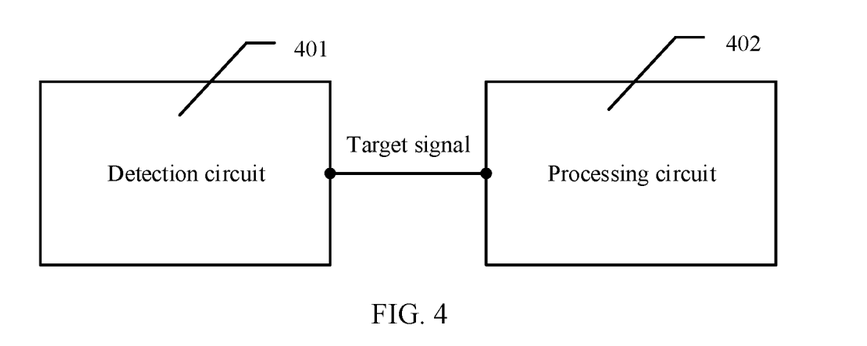
FIG. 4 is another schematic diagram of a structure of a PD detection device.

As shown in FIG. 4, the embodiments of this application provide a powered device PD detection device. The PD detection device includes a detection circuit 401 and a processing circuit 402. The detection circuit 401 is connected to the processing circuit 402. The detection circuit 401 receives hierarchical waveform information from power sourcing equipment, and generates a corresponding first-type signal or a corresponding second-type signal based on the hierarchical waveform information. The first-type signal corresponds to first-type power sourcing equipment, the second-type signal corresponds to second-type power sourcing equipment, the first-type power sourcing equipment includes non-standard power sourcing equipment or an adapter, and the second-type power sourcing equipment includes AF power sourcing equipment, AT power sourcing equipment, or BT power sourcing equipment. The processing circuit is configured to: determine, based on the first-type signal, that the power sourcing equipment is the first-type power sourcing equipment, or determine, based on the second-type signal, that the power sourcing equipment is the second-type power sourcing equipment. Therefore, for the first-type power sourcing equipment, the PD detection device can determine a corresponding type of the power sourcing equipment based on the first-type signal or the second-type signal, without using an isolation circuit. This requires no isolation circuit, reduces complexity of a power over Ethernet system, and reduces costs of the power over Ethernet system.

Based on the foregoing power over Ethernet system, the following describes the PD detection device in the embodiments of this application.

Figure 5:
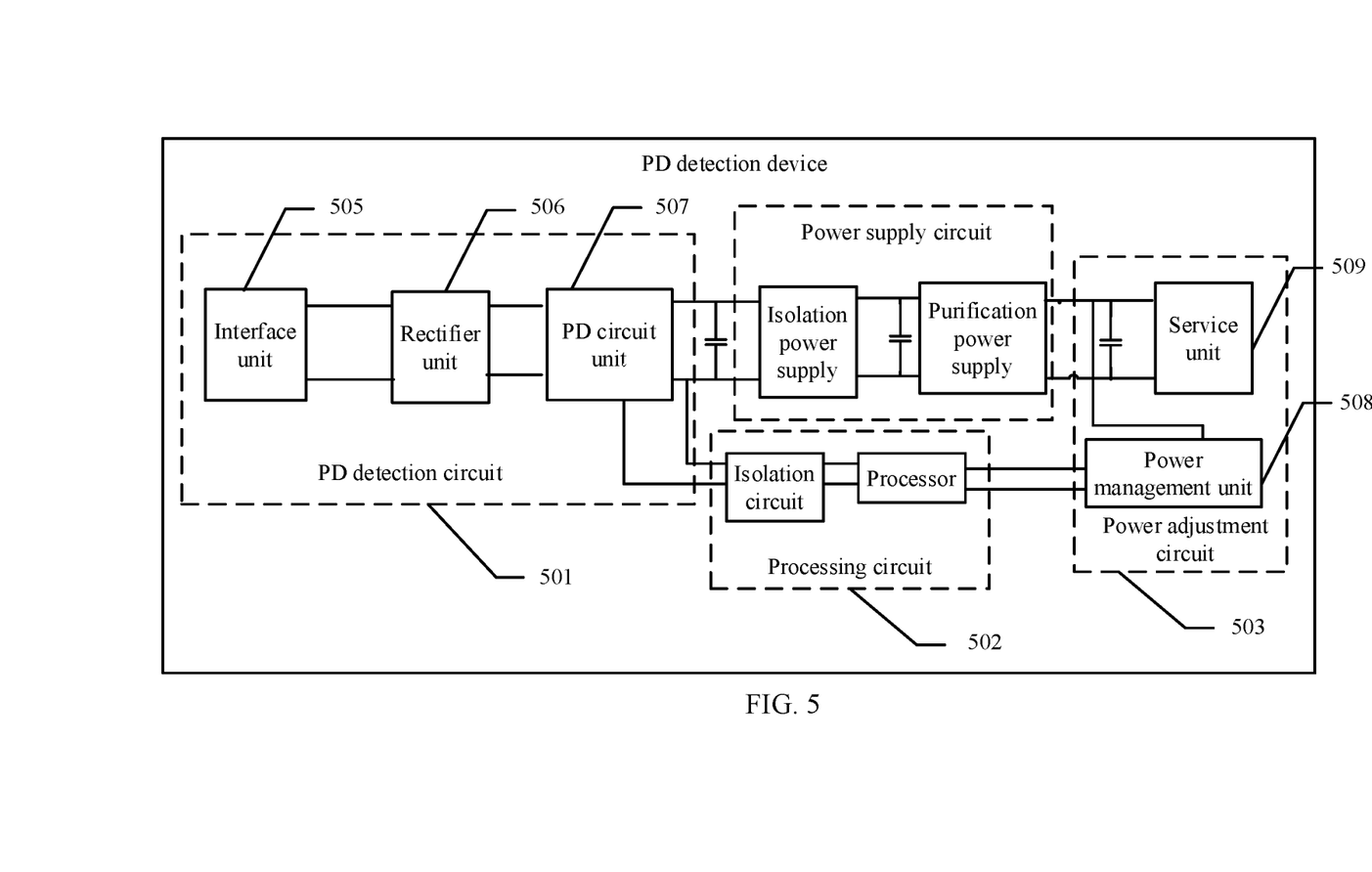
FIG. 5 is another schematic diagram of a structure of a PD detection device.

As shown in FIG. 5, the following describes the PD detection device in the embodiments of this application.

The embodiments of this application include a PD detection device. The PD detection device is connected to power sourcing equipment. The PD detection device includes a detection circuit 501 and a processing circuit 502, and the detection circuit 501 is connected to the processing circuit 502.

The detection circuit 501 is configured to receive hierarchical waveform information sent by the power sourcing equipment. The hierarchical waveform information may indicate a power supply capability of the power sourcing equipment.

In the embodiments of this application, the power sourcing equipment may actively send the hierarchical waveform information to the powered device after establishing the connection to the powered device, or may correspondingly send the hierarchical waveform information after receiving a hierarchical waveform information obtaining request sent by the powered device. The hierarchical waveform information obtaining request indicates the power sourcing equipment to send the hierarchical waveform information to the powered device. This is not specifically limited herein.

Figure 6A:
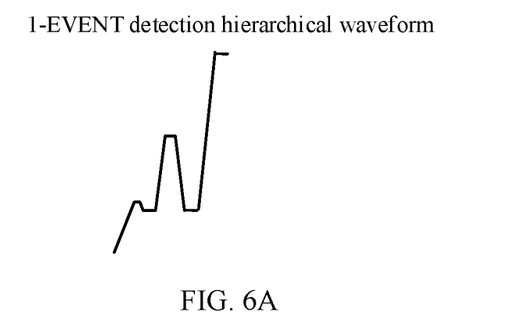
FIG. 6A to FIG. 6E are schematic diagrams of hierarchical waveform information.
Figure 6B:
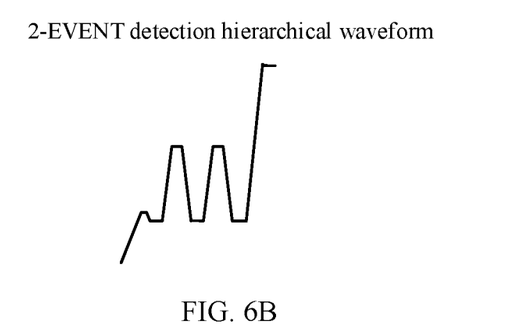
Figure 6C:
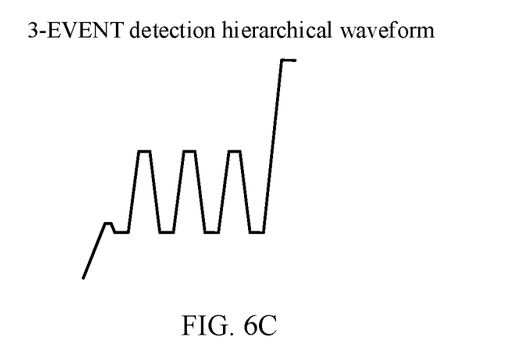
Figure 6D:
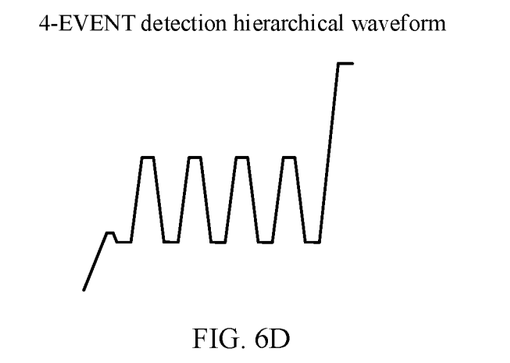
Figure 6E:
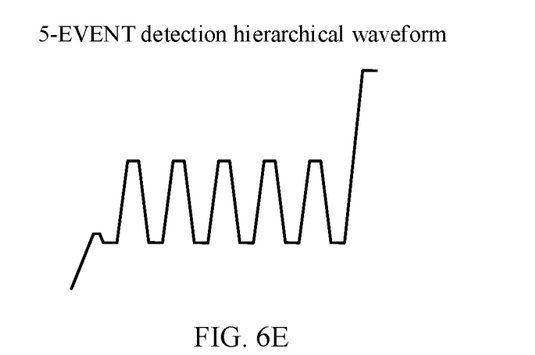

The detection circuit 501 may further generate a corresponding first-type signal or a corresponding second-type signal based on the hierarchical waveform information. For example, different pieces of hierarchical waveform information sent by different power sourcing equipments may include different quantities of hierarchical waveforms. Therefore, a type of the first-type signal or the second-type signal corresponding to the power sourcing equipment may be determined. As shown in FIG. 6A to FIG. 6E, different pieces of hierarchical waveform information of different power sourcing equipments may include different quantities of hierarchical waveforms. For example, FIG. 6A shows a 1-EVENT detection hierarchical waveform with one hierarchical waveform. FIG. 6B shows a 2-EVENT detection hierarchical waveform with two hierarchical waveforms. FIG. 6C shows a 3-EVENT detection hierarchical waveform with three hierarchical waveforms. FIG. 6D shows a 4-EVENT detection hierarchical waveform with four hierarchical waveforms. FIG. 6E shows a 5-EVENT detection hierarchical waveform with five hierarchical waveforms.

For example, different pieces of hierarchical waveform information sent by different power sourcing equipments may include a 1-EVENT detection hierarchical waveform, 2-EVENT detection hierarchical waveform, 3-EVENT detection hierarchical waveform, 4-EVENT detection hierarchical waveform, and 5-EVENT detection hierarchical waveform, that is, may include one, two, three, four, and five hierarchical waveforms. The type of the first-type signal or the second-type signal includes at least one of a first signal, a second signal, a third signal, a fourth signal, and a fifth signal. The first signal, the second signal, the third signal, the fourth signal, and the fifth signal have different voltages or different duty cycles, that is, the first signal, the second signal, the third signal, the fourth signal, and the fifth signal may be distinguished by using a voltage parameter or a duty cycle parameter. In the embodiments of this application, the first-type signal corresponds to first-type power sourcing equipment, and the second-type signal corresponds to second-type power sourcing equipment.

In the embodiments of this application, the first-type signal and the second-type signal may be T2P signals of different voltages or different duty cycles. Alternatively, the first-type signal or the second-type signal may be another signal whose voltage or duty cycle may be changed. This is not specifically limited herein.

In a possible implementation, a correspondence between a type of a detection hierarchical waveform and a type of a T2P signal is shown in Table 2.

TABLE 2

| Type of a detection hierarchical waveform | Signal type | Type of a T2P signal |
| --- | --- | --- |
| 1-EVENT | First signal | HIGH |
| 2-EVENT | Second signal | Low level |
| 3-EVENT | Third signal | 1/2 duty cycle |
| 4-EVENT | Fourth signal | 1/3 duty cycle |
| 5-EVENT | Fifth signal | 1/4 duty cycle |

As shown in Table 2, the signal type corresponding to the 1-EVENT detection hierarchical waveform is the first signal, that is, the high-level T2P signal. The signal type corresponding to the 2-EVENT detection hierarchical waveform is the second signal, that is, the low-level T2P signal. The signal type corresponding to the 3-EVENT detection hierarchical waveform is the third signal, that is, the T2P signal with the ½ duty cycle. The signal type corresponding to the 4-EVENT detection hierarchical waveform is the fourth signal, that is, the T2P signal with the ⅓ duty cycle. The signal type corresponding to the 5-EVENT detection hierarchical waveform is the fifth signal, that is, the T2P signal with the ¼ duty cycle.

In the embodiments of this application, the correspondence between the type of the detection hierarchical waveform and the type of the first-type signal or the second-type signal, that is, the type of the T2P signal, is shown in Table 2. Alternatively, the correspondence between the type of the detection hierarchical waveform and the type of the first-type signal or the second-type signal may be another correspondence. For example, a first-type signal or a second-type signal corresponding to the 1-EVENT detection hierarchical waveform is a T2P signal with a ¼ duty cycle. A first-type signal or a second-type signal corresponding to the 2-EVENT detection hierarchical waveform is a T2P signal with a ⅓ duty cycle. A first-type signal or a second-type signal corresponding to the 3-EVENT detection hierarchical waveform is a T2P signal with a ½ duty cycle. A first-type signal or a second-type signal corresponding to the 4-EVENT detection hierarchical waveform is a low-level T2P signal. A first-type signal or a second-type signal corresponding to the 5-EVENT detection hierarchical waveform is a high-level T2P signal. The duty cycle of the T2P signal may be adjusted based on an actual requirement. This is not specifically limited herein.

The detection circuit 501 is further configured to send the first-type signal or the second-type signal to the processing circuit 502, so that the processing circuit 502 determines a type of the power sourcing equipment based on the first-type signal or the second-type signal. The first-type signal or the second-type signal includes a first-type signal corresponding to first-type power sourcing equipment or a second-type signal corresponding to first-type power sourcing equipment. The first-type signal corresponds to first-type power sourcing equipment, and the second-type signal corresponds to second-type power sourcing equipment. The first-type power sourcing equipment includes at least one of non-standard power sourcing equipment and an adapter, and the second-type power sourcing equipment includes at least one of AF power sourcing equipment, AT power sourcing equipment, and BT power sourcing equipment.

The detection circuit 501 includes an interface unit 505 and a powered device PD circuit unit 506, and the interface unit 505 is connected to the PD circuit unit 506.

The interface unit 505 is configured to: receive the hierarchical waveform information sent by the power sourcing equipment, and send the hierarchical waveform information to the PD circuit unit. The interface unit may receive, by using a link between the interface unit and the power sourcing equipment, the hierarchical waveform information sent by the power sourcing equipment. In addition, the interface unit may further send a hierarchical waveform information obtaining request to the power sourcing equipment by using the link between the interface unit and the power sourcing equipment. The hierarchical waveform information obtaining request indicates the power sourcing equipment to send the hierarchical waveform information. This is not specifically limited herein.

Figure 7:
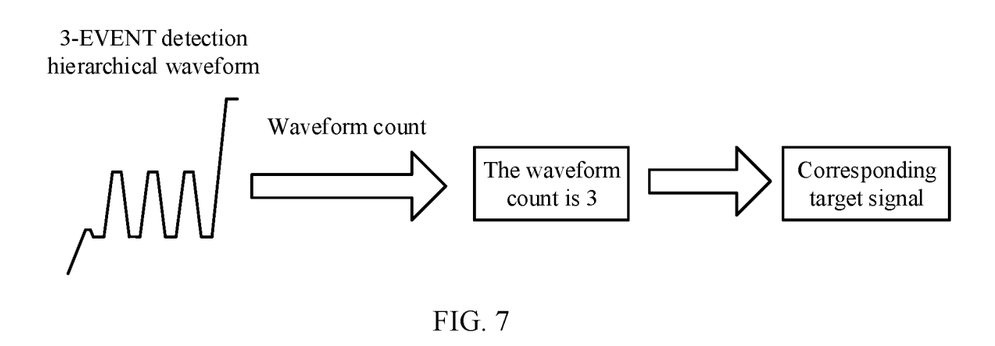
FIG. 7 is a schematic flowchart of a PD detection device.

As shown in FIG. 7, the PD circuit unit 506 is configured to generate a corresponding first-type signal or a corresponding second-type signal based on the hierarchical waveform information. For example, different pieces of hierarchical waveform information sent by different power sourcing equipments may include different quantities of hierarchical waveforms. Therefore, a type of the first-type signal or the second-type signal corresponding to the power sourcing equipment may be determined. For example, different pieces of hierarchical waveform information sent by different power sourcing equipments may include a 1-EVENT detection hierarchical waveform, 2-EVENT detection hierarchical waveform, 3-EVENT detection hierarchical waveform, 4-EVENT detection hierarchical waveform, and 5-EVENT detection hierarchical waveform, that is, may include one, two, three, four, and five hierarchical waveforms. The type of the first-type signal or the second-type signal includes at least one of a first signal, a second signal, a third signal, a fourth signal, and a fifth signal. The first signal, the second signal, the third signal, the fourth signal, and the fifth signal have different voltages or different duty cycles, that is, the first signal, the second signal, the third signal, the fourth signal, and the fifth signal may be distinguished by using a voltage parameter or a duty cycle parameter. In the embodiments of this application, the first-type signal corresponds to first-type power sourcing equipment, and the second-type signal corresponds to second-type power sourcing equipment. For details, refer to the foregoing descriptions of the process in which the detection circuit generates the first-type signal or the second-type signal. Details are not described herein again.

The detection circuit further includes a rectifier unit 507. The rectifier unit 507 is separately connected to an interface unit and a PD circuit unit, and the rectifier unit is configured to: adjust the hierarchical waveform signal, and transmit an adjusted hierarchical waveform signal to the PD circuit unit.

The PD circuit unit is configured to generate the corresponding first-type signal or the corresponding second-type signal based on the adjusted hierarchical waveform signal. For details, refer to the foregoing descriptions of the process in which the PD circuit unit generates the first-type signal or the second-type signal. Details are not described herein again.

The processing circuit 502 is configured to: receive the first-type signal or the second-type signal, and determine a type of the power sourcing equipment based on the first-type signal or the second-type signal.

In a possible implementation, if the first-type signal is a first signal, the power sourcing equipment is the non-standard power sourcing equipment; or if the first-type signal is a second signal, the power sourcing equipment is the adapter, where voltages or duty cycles of the first signal and the second level are different. If the second-type signal is a third signal, the power sourcing equipment is the AF power sourcing equipment; if the second-type signal is a fourth signal, the power sourcing equipment is the AT power sourcing equipment; or if the second-type signal is a fifth signal, the power sourcing equipment is the BT power sourcing equipment. Duty cycles or levels of the third signal, the fourth signal, and the fifth signal are different. Alternatively, a correspondence between the first signal, the second signal, the third signal, the fourth signal, and the fifth signal and the type of the power sourcing equipment, that is, the non-standard PSE, the adapter, the AF power sourcing equipment, the AT power sourcing equipment, and the BT power sourcing equipment, may be adjusted based on an actual requirement. This is not specifically limited herein.

In a possible implementation, the correspondence is shown in Table 3.

TABLE 3

| Type of a T2P signal | Type of power sourcing equipment |
|---|---|
| HIGH | Non-standard PSE |
| Low level | Adapter |
| 1/2 duty cycle | AF |
| 1/3 duty cycle | AT |
| 1/4 duty cycle | BT |

A type of power sourcing equipment and a corresponding target signal type, that is, a corresponding T2P signal type, are shown in Table 3. Power sourcing equipment corresponding to a first signal, that is, a high-level T2P signal, is non-standard power sourcing equipment that conforms to an AF standard. Power sourcing equipment corresponding to a second signal, that is, a low-level T2P signal, is an adapter power sourcing equipment that conforms to an AT standard. Power sourcing equipment corresponding to a third signal, that is, a T2P signal with a ½ duty cycle, is power sourcing equipment that conforms to the AF standard. Power sourcing equipment corresponding to a fourth signal, that is, a T2P signal with a ⅓ duty cycle, is power sourcing equipment that conforms to the AT standard. Power sourcing equipment corresponding to a fifth signal, that is, a T2P signal with a ¼ duty cycle, is power sourcing equipment that conforms to a BT standard.

In the embodiments of this application, the correspondence between the type of the power sourcing equipment and the type of the first-type signal or the second-type signal, that is, the type of the T2P signal, is shown in Table 3. Alternatively, the correspondence between the type of the detection hierarchical waveform and the type of the first-type signal or the second-type signal may be another correspondence. For example, power sourcing equipment corresponding to a high-level T2P signal is power sourcing equipment that conforms to a BT standard, power sourcing equipment corresponding to a low-level T2P signal is power sourcing equipment that conforms to an AT standard, power sourcing equipment corresponding to a T2P signal with a ½ duty cycle is power sourcing equipment that conforms to an AF standard, power sourcing equipment corresponding to a T2P signal with a ¼ duty cycle is non-standard power sourcing equipment, and power sourcing equipment corresponding to a T2P signal with a ⅕ duty cycle is a DC48V adapter. This is not specifically limited herein.

In the embodiments of this application, the duty cycle of the first-type signal or the second-type signal, that is, the T2P signal, may be adjusted based on an actual requirement. This is not specifically limited herein.

The power sourcing equipment further includes a power adjustment circuit 503, and the power adjustment circuit 503 is connected to the processing circuit 502.

The processing circuit 502 is further configured to send a power adjustment signal to the power adjustment circuit 503 based on a type of the power sourcing equipment.

The power adjustment circuit 503 is configured to: receive the power adjustment signal sent by the processing circuit 502, and perform power adjustment based on the power adjustment signal.

For example, the power adjustment circuit includes a power management unit 508 and a service unit 509, and the power management unit 508 is connected to the service unit 509.

The power management unit 508 is configured to: receive the power adjustment signal sent by the processing circuit 502, and adjust an input voltage signal of the service unit 509 based on the power adjustment signal.

The service unit 509 is configured to adjust power of the service unit based on an adjusted input voltage signal.

In the embodiments of this application, the power management unit adjusts the input voltage signal of the service unit. In addition, the power management unit may also adjust another parameter that affects the power of the service unit, for example, at least one of an input current signal or a front-end resistance. This is not specifically limited herein.

The power adjustment circuit 503 adjusts the power of the service unit based on the power sourcing equipment type of the power sourcing equipment, to match a power supply capability of the power sourcing equipment. For example, if the power sourcing equipment is the AF power sourcing equipment, the power adjustment circuit adjusts the power to a value that conforms to the AF standard. If the power sourcing equipment is the AT power sourcing equipment, the power adjustment circuit adjusts the power to a value that conforms to the AT standard. If the power sourcing equipment is the BT power sourcing equipment, the power adjustment circuit adjusts the power to a value that conforms to the BT standard. If the power sourcing equipment is non-standard power sourcing equipment, and the non-standard power sourcing equipment can meet maximum power of the powered device, the power adjustment circuit 503 adjusts the power to the maximum power of the powered device. If the power does not meet the maximum power of the powered device, the power adjustment circuit adjusts the power to maximum power allowed by the non-standard power sourcing equipment. If the powered device determines that the power sourcing equipment is the DC48V adapter, and the DC48V adapter can meet the maximum power of the powered device, the power adjustment circuit adjusts the power to the maximum power of the powered device. If the power does not meet the maximum power of the powered device, the power adjustment circuit adjusts the power to maximum power allowed by the adapter. For example, the power adjustment circuit 503 adjusts the power of the service unit based on the power sourcing equipment type of the power sourcing equipment, and adjusts, based on a power supply standard and a power supply capability of the power sourcing equipment, working power of the service unit to power that can be carried by the power sourcing equipment.

The PD detection device further includes a power supply circuit 504, and the power supply circuit 504 is separately connected to the detection circuit 501 and the power adjustment circuit 503.

The power supply circuit is configured to: adjust a voltage output by the detection circuit, and supply power to the power adjustment circuit.

In the embodiments of this application, the powered device obtains the hierarchical waveform information of the power sourcing equipment by using a hardware connection. Then, the powered device determines the type of the corresponding first-type signal or the corresponding second-type signal based on the hierarchical waveform information of the power sourcing equipment. Next, the powered device determines the power sourcing equipment type of the power sourcing equipment based on the type of the first-type signal or the second-type signal. Finally, the powered device adjusts the power of the powered device based on the power sourcing equipment type of the power sourcing equipment, to match the power supply capability of the power sourcing equipment. The powered device can determine whether the front-end power sourcing equipment is the first-type power sourcing equipment, without obtaining an additional isolation circuit.

Figure 8:
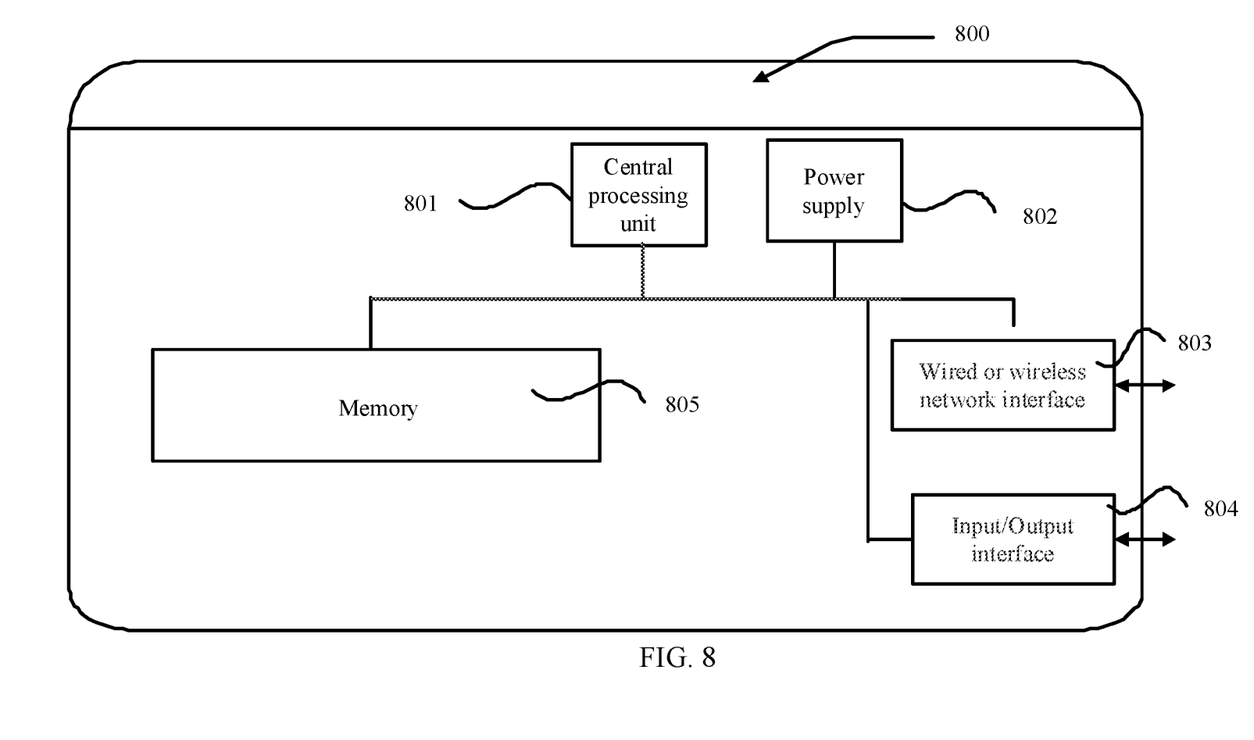
FIG. 8 is another schematic diagram of a structure of a powered device.

FIG. 8 is a schematic diagram of a structure of a powered device according to an embodiment of this application. The powered device 800 may include one or more central processing units (CPU) 801 and a memory 805. The memory 805 stores one or more application programs or data.

The memory 805 may be volatile storage or persistent storage. The program stored in the memory 805 may include one or more circuits, and each circuit may include a series of instruction operations on the powered device. Further, the central processing unit 801 may be configured to: communicate with the memory 805, and perform a series of instruction operations in the memory 805 on the powered device 800.

The central processing unit 801 is configured to execute the computer program in the memory 805, so that the powered device 800 includes a detection circuit and a processing circuit. The detection circuit is connected to the processing circuit. The detection circuit is configured to: receive hierarchical waveform information from power sourcing equipment, and generate a corresponding first-type signal or a corresponding second-type signal based on the hierarchical waveform information. The first-type signal corresponds to first-type power sourcing equipment, the second-type signal corresponds to second-type power sourcing equipment, the first-type power sourcing equipment includes non-standard power sourcing equipment or an adapter, and the second-type power sourcing equipment includes AF power sourcing equipment, AT power sourcing equipment, or BT power sourcing equipment. The processing circuit is configured to: determine, based on the first-type signal, that the power sourcing equipment is the first-type power sourcing equipment, or determine, based on the second-type signal, that the power sourcing equipment is the second-type power sourcing equipment.

The powered device 800 may further include one or more power supplies 802, one or more wired or wireless network interfaces 803, one or more input/output interfaces 804, and/or one or more operating systems, such as Windows Server™, Mac OS X™, Unix™, Linux™, and FreeBSD™.

The powered device 800 includes the PD detection device in the embodiment shown in FIG. 5. Therefore, an operation performed by the PD detection device in the embodiment shown in FIG. 5 may be performed. Details are not described herein again.

Figure 9:
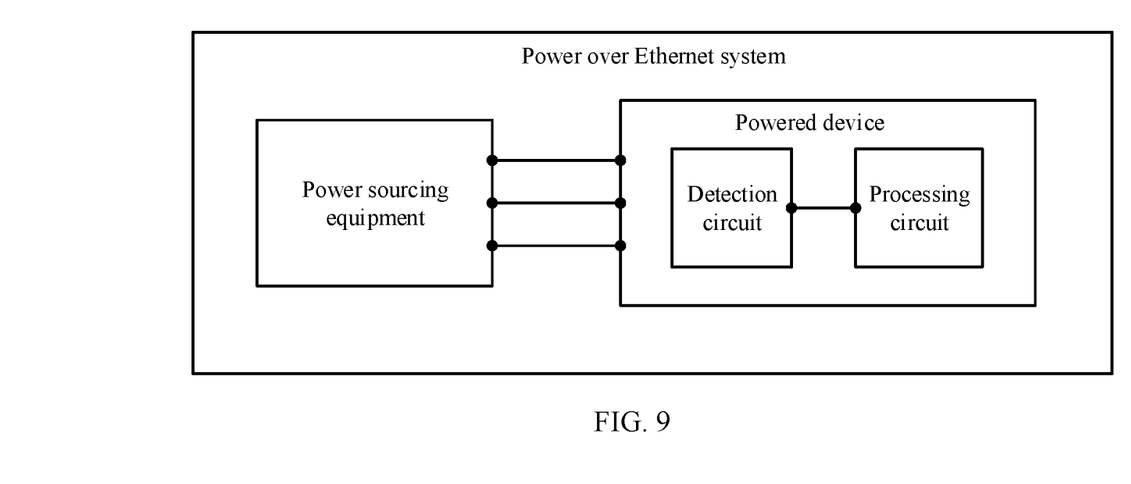
FIG. 9 is a schematic diagram of a structure of a power over Ethernet system.

FIG. 9 shows a power over Ethernet system according to an embodiment of this application. The power over Ethernet system includes the powered device described in any one of the embodiments of FIG. 4 and FIG. 5 and the power sourcing equipment described in any one of the embodiments of FIG. 4 and FIG. 5. The power sourcing equipment is connected to the powered device by using a link, and the power sourcing equipment supplies power and transmits information to the powered device by using the link. The powered device includes a PD detection device. Therefore, the powered device may determine a type of the power sourcing equipment based on hierarchical waveform information sent by the powered device. This is, for example, the same as the PD detection device included in the powered device in the foregoing embodiment shown in FIG. 5. Details are not described herein again.

Persons skilled in the art may clearly understand that, for the purpose of convenient and brief description, for detailed working processes of the foregoing systems, apparatuses, and units, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on an actual requirement to achieve an objective of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A powered device (PD) detection device, comprising:
   a detection circuit; and
   a processing circuit, and the detection circuit is connected to the processing circuit;
   wherein the detection circuit is configured to: receive hierarchical waveform information from power sourcing equipment, and generate a corresponding first-type signal or a corresponding second-type signal based on the hierarchical waveform information, wherein the first-type signal corresponds to first-type power sourcing equipment, the second-type signal corresponds to second-type power sourcing equipment, the first-type power sourcing equipment comprises non-standard power sourcing equipment or an adapter, and the second-type power sourcing equipment comprises AF power sourcing equipment, AT power sourcing equipment, or BT power sourcing equipment; and
   wherein the processing circuit is configured to: determine, based on the first-type signal, that the power sourcing equipment is the first-type power sourcing equipment, or determine, based on the second-type signal, that the power sourcing equipment is the second-type power sourcing equipment.

2. The PD detection device according to claim 1, wherein in response to the first-type signal being a first signal, the power sourcing equipment is the non-standard power sourcing equipment; in response to the first-type signal being a second signal, the power sourcing equipment is the adapter, wherein voltages or duty cycles of the first signal and the second signal are different.

3. The PD detection device according to claim 1, wherein in response to the second-type signal being a third signal, the power sourcing equipment is the AF power sourcing equipment; in response to the second-type signal being a fourth signal, the power sourcing equipment is the AT power sourcing equipment; in response to the second-type signal being a fifth signal, the power sourcing equipment is the BT power sourcing equipment, wherein duty cycles or levels of the third signal, the fourth signal, and the fifth signal are different.

4. The PD detection device according to claim 1, further comprising:
   a power adjustment circuit, and the power adjustment circuit is connected to the processing circuit;
   wherein the processing circuit is further configured to send a power adjustment signal to the power adjustment circuit based on a type of the power sourcing equipment; and
   wherein the power adjustment circuit is configured to perform power adjustment based on the power adjustment signal.

5. The PD detection device according to claim 4, wherein the power adjustment circuit comprises a power management unit and a service unit, and the power management unit is connected to the service unit; and
   wherein the power management unit is configured to adjust an input signal of the service unit based on the power adjustment signal, and wherein the input signal comprises at least one of an input voltage or an input current.

6. The PD detection device according to claim 5, wherein in response to the power sourcing equipment being the adapter,
   the power adjustment circuit is configured to adjust, based on the power adjustment signal, power of the service unit to the maximum power allowed by the adapter.

7. The PD detection device according to claim 4, wherein the PD detection device further comprises a power supply circuit, and the power supply circuit is separately connected to the detection circuit and the power adjustment circuit; and
   the power supply circuit is configured to: adjust a voltage output by the detection circuit, and supply power to the power adjustment circuit.

8. The PD detection device according to claim 1, wherein the detection circuit comprises an interface unit and a powered device (PD) circuit unit, and the interface unit is connected to the PD circuit unit;
   the interface unit is configured to: receive the hierarchical waveform information sent by the power sourcing equipment, and send the hierarchical waveform information to the PD circuit unit; and
   the PD circuit unit is configured to generate the corresponding first-type signal or the corresponding second-type signal based on the hierarchical waveform information.

9. The PD detection device according to claim 8, wherein the detection circuit further comprises a rectifier unit;
   wherein the rectifier unit is configured to: adjust the hierarchical waveform signal, and transmit the adjusted hierarchical waveform signal to the PD circuit unit; and
   wherein the PD circuit unit is configured to generate the corresponding first-type signal or the corresponding second-type signal based on the adjusted hierarchical waveform signal.

10. A powered device, comprising:
    a powered device (PD) detection device, wherein the PD detection device comprises a detection circuit and a processing circuit, and the detection circuit is connected to the processing circuit;
    wherein the detection circuit is configured to: receive hierarchical waveform information from power sourcing equipment, and generate a corresponding first-type signal or a corresponding second-type signal based on the hierarchical waveform information, wherein the first-type signal corresponds to first-type power sourcing equipment, the second-type signal corresponds to second-type power sourcing equipment, the first-type power sourcing equipment comprises non-standard power sourcing equipment or an adapter, and the second-type power sourcing equipment comprises AF power sourcing equipment, AT power sourcing equipment, or BT power sourcing equipment; and wherein the processing circuit is configured to: determine, based on the first-type signal, that the power sourcing equipment is the first-type power sourcing equipment, or determine, based on the second-type signal, that the power sourcing equipment is the second-type power sourcing equipment.

11. The powered device according to claim 10, wherein in response to the first-type signal being a first signal, the power sourcing equipment is the non-standard power sourcing equipment; in response to the first-type signal being a second signal, the power sourcing equipment is the adapter, wherein voltages or duty cycles of the first signal and the second signal are different.

12. The powered device according to claim 10, wherein in response to the second-type signal being a third signal, the power sourcing equipment is the AF power sourcing equipment; in response to the second-type signal being a fourth signal, the power sourcing equipment is the AT power sourcing equipment; in response to the second-type signal being a fifth signal, the power sourcing equipment is the BT power sourcing equipment, wherein duty cycles or levels of the third signal, the fourth signal, and the fifth signal are different.

13. The powered device according to claim 10, wherein the PD detection device further comprises:
a power adjustment circuit, and the power adjustment circuit is connected to the processing circuit;
wherein the processing circuit is further configured to send a power adjustment signal to the power adjustment circuit based on a type of the power sourcing equipment; and
wherein the power adjustment circuit is configured to perform power adjustment based on the power adjustment signal.

14. The powered device according to claim 13, wherein the power adjustment circuit comprises a power management unit and a service unit, and the power management unit is connected to the service unit; and
wherein the power management unit is configured to adjust an input signal of the service unit based on the power adjustment signal, and wherein the input signal comprises at least one of an input voltage or an input current.

15. The powered device according to claim 14, wherein in response to the power sourcing equipment being the adapter, the power adjustment circuit is configured to adjust, based on the power adjustment signal, power of the service unit to the maximum power allowed by the adapter.

16. A power over Ethernet system, comprising
a powered device, wherein the powered device comprises a powered device (PD) detection device; and
power sourcing equipment, wherein the power sourcing equipment is connected to the powered device by using a link, and the power sourcing equipment supplies power and transmits information to the powered device by using the link;
the PD detection device comprises a detection circuit and a processing circuit, and the detection circuit is connected to the processing circuit;
wherein the detection circuit is configured to: receive hierarchical waveform information from power sourcing equipment, and generate a corresponding first-type signal or a corresponding second-type signal based on the hierarchical waveform information, wherein the first-type signal corresponds to first-type power sourcing equipment, the second-type signal corresponds to second-type power sourcing equipment, the first-type power sourcing equipment comprises non-standard power sourcing equipment or an adapter, and the second-type power sourcing equipment comprises AF power sourcing equipment, AT power sourcing equipment, or BT power sourcing equipment; and
wherein the processing circuit is configured to: determine, based on the first-type signal, that the power sourcing equipment is the first-type power sourcing equipment, or determine, based on the second-type signal, that the power sourcing equipment is the second-type power sourcing equipment.

17. The power over Ethernet system according to claim 16, wherein in response to the first-type signal being a first signal, the power sourcing equipment is the non-standard power sourcing equipment; in response to the first-type signal being a second signal, the power sourcing equipment is the adapter, wherein voltages or duty cycles of the first signal and the second signal are different.

18. The power over Ethernet system according to claim 16, wherein the PD detection device further comprises:
a power adjustment circuit, and the power adjustment circuit is connected to the processing circuit;
wherein the processing circuit is further configured to send a power adjustment signal to the power adjustment circuit based on a type of the power sourcing equipment; and
wherein the power adjustment circuit is configured to perform power adjustment based on the power adjustment signal.

19. The power over Ethernet system according to claim 18, wherein the power adjustment circuit comprises a power management unit and a service unit, and the power management unit is connected to the service unit; and
wherein the power management unit is configured to adjust an input signal of the service unit based on the power adjustment signal, and wherein the input signal comprises at least one of an input voltage or an input current.

20. The power over Ethernet system according to claim 19, wherein in response to the power sourcing equipment being the adapter,
the power adjustment circuit is configured to adjust, based on the power adjustment signal, power of the service unit to the maximum power allowed by the adapter.

* * * * *